United States Patent [19]

Ryan et al.

[11] Patent Number: 5,789,472
[45] Date of Patent: Aug. 4, 1998

[54] QUATERNARY MANNICH POLYMER MICROEMULSION (QMM) WITH RAPID STANDARD VISCOSITY (SV) DEVELOPMENT

[75] Inventors: Michael Ryan, Shelton; Lucyna Pawlowska, Norwalk, both of Conn.

[73] Assignee: Cytec Technology Corp., Wilmington, Del.

[21] Appl. No.: 618,706

[22] Filed: Mar. 20, 1996

[51] Int. Cl.$^6$ .................................................. C08K 5/17
[52] U.S. Cl. .................................. 524/251; 524/801
[58] Field of Search .............................. 524/251, 801

[56] References Cited

U.S. PATENT DOCUMENTS

| | | | |
|---|---|---|---|
| 3,673,164 | 6/1972 | Jones | 526/291 |
| 4,021,364 | 5/1977 | Speiser et al. | 252/316 |
| 4,085,074 | 4/1978 | Woo | 524/251 |
| 4,221,688 | 9/1980 | Johnson | 524/251 |
| 4,299,741 | 11/1981 | Doehnert | 524/251 |
| 4,325,859 | 4/1982 | Blount | 524/251 |
| 4,521,317 | 6/1985 | Candau et al. | 252/8.55 |
| 4,681,912 | 7/1987 | Durand et al. | 524/827 |
| 4,956,399 | 9/1990 | Kozakiewicz et al. | 523/223 |
| 4,956,400 | 9/1990 | Kozakiewicz et al. | 523/223 |
| 5,037,863 | 8/1991 | Kozakiewicz et al. | 523/223 |
| 5,037,881 | 8/1991 | Kozakiewicz et al. | 524/812 |
| 5,132,023 | 7/1992 | Kozakiewicz et al. | 523/223 |
| 5,167,766 | 12/1992 | Honig | 162/164.1 |

FOREIGN PATENT DOCUMENTS 2162492   2/1986   United Kingdom.

OTHER PUBLICATIONS

Anonymous, Inverters for Separan® mannich quat emulsion polymers, 2 pages, Research Disclosure 02415.

*Primary Examiner*—Paul R. Michl
*Attorney, Agent, or Firm*—Pennie & Edmonds, LLP

[57] ABSTRACT

A method for increasing the standard viscosity (SV) of an emulsion, and the composition of the emulsion resulting thereby is provided. Also, an alternative method for increasing the standard viscosity as well as increasing the shelf life, i.e., SV stability, of quaternary mannich microemulsion is provided.

20 Claims, No Drawings

5,789,472

QUATERNARY MANNICH POLYMER MICROEMULSION (QMM) WITH RAPID STANDARD VISCOSITY (SV) DEVELOPMENT

TECHNICAL FIELD

This invention relates to a method for increasing the standard viscosity (SV) of an emulsion, and the composition of the emulsion resulting thereby. In particular, this invention relates to an alternative method for increasing the standard viscosity as well as increasing the shelf life, i.e., SV stability, of quaternary Mannich microemulsion.

BACKGROUND OF THE INVENTION

Amino methylated or Mannich (alk)acrylamide polymers in inverse (water-in-oil) microemulsion form are commonly used as flocculants for separating suspended material from aqueous dispersions. As such, they are preferred over other types of flocculants because of their high solids content, low bulk viscosity, their tendency to reduce interpolymer crosslinking problems, and superior performance. These inverse microemulsion Mannich acrylamide polymers (microemulsion Mannich PAMS) are described in U.S. Pat. Nos. 4,956,399; 4,956,400; 5,037,863; 5,132,023 and 5,037,881, which are incorporated herein by reference. Oftentimes, these Mannich acrylamide polymers are quaternized and used in their highly charged cationic state.

Quaternized Mannich microemulsions (QMM) generally have a lower standard viscosity (SV) or a less stable shelf life (SV stability) than the non-quaternized forms. As a result, it has been common practice to apply heat subsequent to the addition of an acidic solution, to increase standard viscosity as well as the shelf life of such QMMs. After the QMM has been prepared, an acidic solution is admixed, the emulsion is heated for an extended period of time, typically up to about 20 hours or longer. Another method for increasing the SV of QMMs is to adjust the pH of the inverted emulsion directly. Each of these methods has certain disadvantages.

The heat treatment process involves the addition of an aqueous buffer to the emulsion. This buffer typically incorporates an acid and urea. This treated emulsion is then heated to "activate" the product. Although the resulting product has good SV stability and has an ease of inversion, there are certain disadvantages including increased manufacturing time required to produce the polymeric product, lowered solid content, increased bulk viscosity, and increased formation of coagulum and sludge during processing.

The adjustment of pH may sometimes also be undesirable as a second step to the inversion procedure as it will provide no increase in long term product stability. Moreover, the procedure for activation may involve the use of hazardous chemicals at a customer site.

Accelerating the rate of inversion of a water-in-oil emulsion cationic polymer into water has been anonymously disclosed in Research Disclosure 02415. That process requires contact of the emulsion with a basic material, such as an inorganic base or a cationic surfactant. For example, amide-amine betaine is added to the water-in-oil emulsion. This emulsion is then added to a water solution containing dissolved calcium and magnesium cations prior to inversion. Further base or basic surfactants are required to adjust the pH to 6.5 to 9, preferably 8.5 to 9. The use of amide-amine betaine is not a part of the present invention. More importantly, the preferable range of the pH resulting from 02415 teaches away from the present invention as such high pH would necessarily degrade the product resulting from the claimed invention.

Accordingly, there is a need for a process which can produce a composition having a significantly increased SV and SV stability without heat treatment and without pH adjustments, the composition resulting therefrom having characteristics similar to the composition prepared by treatment with heat or with the adjustment with pH. Further, because the method and the composition deriving therefrom do not involve heat activation, the manufacturing time is decreased. Additionally, as only a comparatively small amount of additives are added, the solids level of the resulting composition will be higher than those produced from the methods in the art. The bulk viscosity remains constant with that of the untreated emulsion, as compared to the high bulk viscosity from the emulsion of the alternative procedure. Moreover, such new method does not produce a significant amount of coagulum and sludge.

Therefore, the present invention provides a method for increasing the SV and shelf life of an emulsion, and the composition of the emulsion resulting thereby without the use of heat treatment. In particular, this invention relates to an alternative method for increasing the standard viscosity as well as increasing the shelf life, i.e., SV stability, of quaternary Mannich microemulsion polymer.

SUMMARY OF THE INVENTION

According to the present invention there is provided a process for increasing the development and rate of standard viscosity of a polymeric emulsion comprising admixing the polymeric emulsion with trialkylamine. Preferably, the emulsion is a microemulsion; more preferably, a quaternary Mannich microemulsion; and most preferably, an acrylamide quaternary Mannich microemulsion. The alkyl groups of the trialkylamine have from 2 to 6, preferably 3 to 5 carbon atoms, inclusive, and include tripropyl, tributyl or tripentyl, most preferably, tributyl.

There is also provided a process for increasing the development and rate of standard viscosity of an quaternary Mannich microemulsion polymer by admixing the polymer with tributylamine and acid, preferably a lactic acid, sulfuric acid, citric acid or acetic acid, and most preferably a lactic acid.

There is provided an emulsion having a full and rapid development of SV and an increase in SV without heat activation as determined by standard viscosity measurements and pH measurements comprising an emulsion from about 0.5 to about 2.0% (w/w) acid, and from about 1% to about 5% trialkylamine.

Additionally, there is also provided a quaternary Mannich microemulsion having full and rapid development of SV and an increase in SV without heat activation as determined by standard viscosity measurements and pH measurements comprising quaternary Mannich microemulsion, from about 0.5 to about 2.0% (w/w) acid and from about 1% to about 5% trialkylamine.

Polymerization, according to the present invention, is carried out by the addition of a polymerization initiator or by subjecting the inverse microemulsion to ultraviolet or ionizing irradiation.

Formaldehydes useful in the practice of this invention are selected from formaldehyde, paraformaldehyde, trioxane or aqueous formalin, etc.

Useful secondary amines are selected from dimethylamine, amylmethylamine, methylethylamine, diethylamine, dibutylamine, dibenzylamine, piperidine, morpholine, ethanolmethylamine, diethanolamine or mixtures thereof.

Especially preferred is a process wherein the formaldehyde comprises formalin and the amine comprises dimethylamine. It is also contemplated to employ a formaldehyde-secondary amine complex such as N,N'-dimethylaminomethanol.

DETAILED DESCRIPTION OF THE INVENTION

The present invention, in a broad sense, is directed to a stable emulsion with a highly developed standard viscosity. More specifically, this invention provides a new process which yields a product with characteristics similar to heat treated microemulsion.

Preparation of Mannich acrylamide polymers as small, aqueous, inverse microemulsion droplets or micelles allows the composition to be prepared at a high polymer solids content while substantially eliminating the detrimental interpolymer cross-linking problems inherent in inverse emulsion and solution product forms thereof and while simultaneously maintaining a low product bulk viscosity.

The compositions of this invention comprise (alk) acrylamide-containing polymeric microparticles, the (alk) acrylamide polymer being substituted with tertiary aminomethyl groups and having an average particle size of from about 200 to about 4000 A in diameter and are generally prepared by an inverse microemulsion polymerization process.

The polymer is admixed with an amine and a water soluble acid. The acid and the amine must remain partitioned in separate phases so as not to be neutralized within the emulsion. Preferably, the acid is lactic acid, sulfuric acid, citric acid or acetic acid. Most preferably, the acid is lactic acid.

Hydrophobic amines are useful in the practice of this invention. The preferred amine does not diffuse, or diffuses only minimally into the aqueous phase, while remaining in the oil phase thereby maintaining a low microemulsion apparent pH. The preferred amine also has hydrophilic characteristics to increase the pH of the inverted microemulsion, however, and possess a structure which would exclude the basic functionality from the micelle.

The preferred amine is a tertiary amine. More preferably, the amine is tripropylamine, tributylamine or tripentylamine, with tributylamine being most preferred.

This invention initially employs the addition of acid to the emulsion as a stabilizer and then the addition of the amine. The water soluble acid has an affinity to the polymer in the discontinuous phase of the emulsion. The hydrophobic amine generally resides in the oil phase.

The backbone of the Mannich acrylamide polymers of the present invention may comprise units of such (alk) acrylamides as acrylamide, methacrylamide, ethacrylamide and the like.

The backbones of the Mannich acrylamide polymers of the present invention may also comprise an (alk)acrylamide copolymerized with a cationic or non-ionic, water-soluble, ethylenically unsaturated comonomer in amounts of up to about 90%, by weight, based on the total weight of polymer.

Useful cationic monomers include diallyl dialkylammonium chlorides, N,N-dialkylamino alkyl(meth)acrylamides, their salts, their quaternaries and mixtures thereof.

Water soluble, non-ionic monomers, suitable in the practice of this invention may comprise N-vinylpyrrolidone, N,N-dialkylmethylamides, hydroxyalkyl methacrylates; n-vinylformamide and the like. Small quantities, i.e., up to about 10%, by weight, of other copolymerizable monomers, such as methyl acrylate; methyl methacrylate; acrylonitrile; vinyl acetate; styrene, etc. may also be used.

Formaldehydes suitable for use in this invention, as mentioned above, are selected from formaldehyde; paraformaldehyde; trioxane; aqueous formalin and mixtures thereof. Secondary amines suitable for use in the practice of this invention are selected from those containing from about 2 to about 8 carbon atoms which are aliphatic, cyclic, straight chained or branched.

The composition of the present invention may be prepared using microemulsion polymerization techniques. Polymerization in microemulsions and inverse microemulsions is known to those skilled in this art. Both water-in-oil and oil-in-water systems can be used to prepare these nanoparticles. The practice of making and using polymeric microemulsion have been known in the art. See, U.S. Pat. Nos. 4,021,364, 4,521,317, 4,681,912, 5,132,023 and GB 2162492A, incorporated herein by reference.

In general, microemulsion polymerization processes are conducted by (i) preparing a monomer microemulsion by mixing an aqueous solution of monomers with a hydrocarbon liquid containing an appropriate surfactant or surfactant mixture to form an inverse microemulsion consisting of small aqueous monomer droplets dispersed in the continuous oil phase and (ii) subjecting the monomer microemulsion to free radical polymerization.

A microemulsion, for the purpose of this invention, is generally defined as a thermodynamically stable composition comprising two liquids or phases which are insoluble in each other along with a surfactant or surfactant mixture. Polymeric inverse microemulsions which contain a continuous oil phase and a polymer-containing discontinuous phase (aqueous droplets) are prepared from thermodynamically stable monomer microemulsions. Inverse microemulsions have a narrow droplet size distribution and are usually, but not always, optically transparent. The discontinuous polymer-containing phase of microemulsions form droplets or micelles, which are usually aqueous and usually have an average droplet diameter which is less than about 3000 A, preferably less than about 2000 A, and most preferably less than about 1000 A. Some microemulsions may have an average droplet diameter as large as about 3500 A.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase. Suitable monomers are non-ionic, anionic and cationic and are defined above. The aqueous monomer solution may contain such conventional additives as are desired. For example, the solution may contain chelating agents to remove polymerization inhibitors, chain-transfer agents, pH adjusters, initiators and other conventional additives.

Essential to the formation of the microemulsion, which may preferably be defined as a transparent and thermodynamically stable solution, comprising two liquids insoluble in each other and a surfactant, in which the micelles are usually 1000 A or less in diameter, is the selection of appropriate organic phase and surfactant.

The selection of the organic phase has a substantial effect on the minimum surfactant concentration necessary to obtain the inverse microemulsion and may consist of a hydrocarbon or hydrocarbon mixture. Isoparaffinic hydrocarbons or hydrocarbon mixtures are the most desirable in order to obtain inexpensive formulations. Typically the organic phase will comprise mineral oil, toluene, fuel oil, kerosene, odorless mineral spirits, mixtures of any of the foregoing and the like.

The ratio by weight of the amounts of aqueous phase and hydrocarbon phase is chosen as high as possible so as to obtain, after polymerization, a microemulsion of high polymer content. Practically, this ratio usually approximates 1:1.

The one or more surfactants are selected in order to obtain an HLB (Hydrophilic Lipophilic Balance) value ranging from about 8 to about 12. Outside this range, formation of inverse microemulsions generally cannot be attained. In addition to the appropriate HLB value, the concentration of surfactant must be optimized, i.e., sufficient to form an inverse microemulsion. Typical surfactants useful in the practice of this invention may be anionic, cationic or non-ionic. Preferred surfactants include sorbitan monooleate, polyoxyethylene (20) sorbitan monooleate, sodium dioctylsulfosuccinate, oleamidopropyldimethyl amine, sodium isostearyl-2-lactate and the like.

Polymerization of the microemulsion may be carried out in any manner known to those skilled in the art. Initiation may be effected with a variety of thermal and redox free radical initiators, including peroxides; azo compounds; inorganic compounds; and redox couples. Initiator addition may be effected any time prior to the actual polymerization. Polymerization may also be effected by photochemical irradiation processes, such as ultraviolet irradiation or by ionization irradiation from a cobalt 60 source.

The amino methylation or Mannich reaction is preferably performed after inverse microemulsion polymerization by adding formaldehyde and secondary amine to the polymer to form the tertiary aminomethyl substituent on the (alk) acrylamide portion of the polymer backbone.

It is also possible to perform the Mannich substitution reaction at various stages in relation to the inverse microemulsion polymerization. The formaldehyde and secondary amine may be added after the inverse microemulsion polymerization of the (alk)acrylamide polymer backbone.

The polymers of the present invention can conveniently be employed as flocculants prepared in the form of dilute aqueous solutions. These solutions can be prepared by inverting the microemulsion into water, optionally in the presence of a breaker surfactant.

Concentrating dispersions of suspended solids is carried out by adding an effective amount of the composition of this invention, in solution form, to the suspension to remove water there to produce an effluent of desired characteristics.

The products of this invention are useful in facilitating a wide range of solid-liquid separation operations.

The cationic polymers may be used in the dewatering of biologically treated suspensions, such as sewage and other municipal or industrial sludge, the drainage of cellulosic suspension such as those found in paper production, e.g., paper waste, and the settlement of various inorganic suspensions, i.e., refinery waste, food waste, etc.

DESCRIPTION OF THE PREFERRED EMBODIMENTS

While it is apparent that the invention herein disclosed is well calculated to describe the invention stated above, it should be appreciated that numerous modifications and embodiments may be devised by those skilled in the art, and it is intended that the appended claims cover all such modifications and embodiments as they fall within the true spirit and scope of the present invention.

Standard viscosity (SV) is measured by adding 10.8 parts of a 10.87% aqueous solution of sodium chloride to 10.0 parts of a 0.2% aqueous polymer solution aged for 30 minutes. The resultant mixture is stirred for five minutes with the viscosity determined at 25°±0.1° C. using a Brookfield viscometer Model DV II with UL adaptor at 60 rpm.

EXAMPLE 1

A quaternary Mannich microemulsion (QMM) is prepared generally by the method as found in U.S. Pat. No. 4,956,399, incorporated herein by reference.

Microemulsion Preparation 123.3 parts of an aqueous solution containing 56.5 parts acrylamide (AMD), 3.0 parts acetic acid (AA), and 0.10 part disodium salt of ethylenediaminetetraacetic acid ($Na_2EDTA$). The resultant aqueous solution is then added to an organic solution containing 102.8 parts of an isoparaffinic solvent (IPS) having a b.p. of 207° to 254° C., 17.6 parts of polyoxyethylenesorbitol hexaoleate (PESH), and 5.9 parts of sorbitan sesquioleate (SS). This is subsequently sparged with nitrogen for 30 minutes at a flow rate of 500 ml/min.

The nitrogen sparge is then lowered to 200 ml/min. and 0.4 part isopropanol (IPA) and an aqueous solution containing 0.0085 parts sodium bromate ($NaBrO_3$) which is presparged are added. Sparging is continued for approximately five minutes when polymerization is initiated by the introduction of 0.1% $SO_2$ in nitrogen at a flow rate of 30 to 85 ml/min.

The result is a clear and stable (acrylamide) polymeric microemulsion (SV=3.7 cps).

DMAM Preparation

N,N-dimethylaminomethanol (DMAM) is prepared by slowly adding 21.2 parts of 92.5% paraformaldehyde to an appropriate flask containing 48.6 parts of a 60% aqueous solution of dimethylamine and 22.1 parts of deionized water, keeping the exotherm below 25° C. Upon dissolution of the paraformaldehyde, 1.51 parts of methanol, 2.75 parts of dicyandiamide, and 3.86 parts of 97.9% sodium metabisulfite is added for stabilization. After stirring for one hour, any insolubles are allowed to settle and the clear solution containing 49 parts of DMAM solids is decanted.

Mannich AMD Polymeric Microemulsion

100 Parts of the above microemulsion are placed in a suitable reactor. The microemulsion is then diluted to 18.8% solids with the isoparaffinic solvent used above. 41.9 Parts of the above DMAM solution is added to the reactor at a rate of 0.53 ml/min with ample stirring. Subsequent to the addition, the reaction is heated to 35° C. and held for 4.5 hours. The Mannich product is stored under refrigeration and has an SV of 3.8 cps.

Quaternary Mannich Polymeric Microemulsion Preparation 3.26 Parts of alkylaryl polyethylene glycol ether (AAPEG) are added to 100 parts of the Mannich product at the rate of 0.1 ml/min. This mixture is then transferred to a Parr Series 4560 mini-reactor and stirred. The reactor is evacuated to 100 torr and heated to 30° C. 10.56 Parts of methyl chloride gas are delivered at 30 psig. Upon completion of the methyl chloride charge, the reactor is heated to 35° C. for 16 hours. The reactor is then slowly evacuated to 100 torr and maintained for 30 minutes to strip excess methyl chloride. The quaternary microemulsion product (QMM) is clear and stable with an SV of 1.61 cps.

EXAMPLES 2 TO 8

Examples 2 to 8 describe the standard viscosity measurements and pH measurements for a series of trialkylamines and their effect on the QMM from Example 1. A summary of the pH of the QMM, the pH of the inverted solution and the SV is tabulated in Table 1.

EXAMPLE 2

60.0 Parts of the QMM from Example 1 were placed in a vessel with stirring. 1.80 Parts of triethylamine were added dropwise. The resulting mixture was then stirred for 10 minutes prior to measuring the standard viscosity and the pH of the mixture. The pH of the QMM was 9.13; the pH of the solution at inversion was 8.58. The SV of the QMM was 1.95.

EXAMPLE 3

The procedure of Example 2 was repeated using tripropylamine instead of triethylamine. The pH of the QMM was 7.12; the pH of the solution at inversion was 8.25. The SV of the QMM was 2.00.

EXAMPLE 4

The procedure of Example 2 was repeated using tributylamine instead of triethylamine. The pH of the QMM was 6.25; the pH of the solution at inversion was 7.57. The SV of the QMM was 2.44.

EXAMPLE 5

The procedure of Example 2 was repeated using tripentylamine instead of triethylamine. The pH of the QMM was 5.84; the pH of the solution at inversion was 6.47. The SV of the QMM was 2.39.

EXAMPLE 6 (COMPARATIVE)

The procedure of Example 2 was repeated using trihexylamine instead of triethylamine. The pH of the QMM was 5.82; the pH of the solution at inversion was 5.41. The SV of the QMM was 1.70.

EXAMPLE 7 (COMPARATIVE)

The procedure of Example 2 was repeated using trioctylamine instead of triethylamine. The pH of the QMM was 5.80; the pH of the solution at inversion was 5.05. The SV of the QMM was 1.61.

EXAMPLE 8 (COMPARATIVE)

The procedure of Example 2 was repeated using triisodecylamine instead of triethylamine. The pH of the QMM was 5.76; the pH of the solution at inversion was 5.21. The SV of the QMM was 1.60.

EXAMPLE 9 (COMPARATIVE)

The procedure of Example 2 was repeated using 0.50 part of oleylamine instead of triethylamine. The pH of the QMM was 6.14; the pH of the solution at inversion was 5.27. The SV of the QMM was 1.50.

EXAMPLE 10

The procedure of Example 2 was repeated using 0.60 part of tributylamine instead of triethylamine. The pH of the QMM was 5.94; the pH of the solution at inversion was 6.37. The SV of the QMM was 2.30.

EXAMPLE 11

The procedure of Example 2 was repeated using 1.20 parts of tributylamine instead of triethylamine. The pH of the QMM was 6.12; the pH of the solution at inversion was 7.60. The SV of the QMM was 2.56.

EXAMPLE 12

The procedure of Example 2 was repeated using 1.8 parts of triisobutylamine instead of triethylamine. The pH of the QMM was 6.15; the pH of the solution at inversion was 6.50. The SV of the QMM was 1.99.

EXAMPLE 13

The procedure of Example 2 was repeated except a 20% aqueous solution containing 0.13 part of sodium hydroxide was added to the QMM. The pH of the QMM was 7.00 and the SV of the QMM was 1.74.

TABLE 1

| Example | pH of QMM | pH of inverted solution | SV |
|---|---|---|---|
| 1C | 5.72 | 5.12 | 1.61 |
| 2 | 9.13 | 8.58 | 1.95 |
| 3 | 7.12 | 8.25 | 2.00 |
| 4 | 6.25 | 7.57 | 2.44 |
| 5C | 5.84 | 6.47 | 2.39 |
| 6C | 5.82 | 5.41 | 1.70 |
| 7C | 5.80 | 5.05 | 1.61 |
| 8C | 5.76 | 5.21 | 1.60 |
| 9C | 6.14 | 5.27 | 1.50 |
| 10C | 5.94 | 6.37 | 2.30 |
| 11C | 6.12 | 7.60 | 2.56 |
| 12C | 6.15 | 6.50 | 1.99 |
| 13C | 7.00 | — | 1.74 |

C = comparative

EXAMPLES 14 AND 15

Examples 14 and 15 demonstrate the effect of storage on the SV. The period of time the QMM is stored is measured in hours at 50° C. The results are tabulated in Table 2.

EXAMPLE 14

The procedure of Example 2 was repeated except 0.61 part of lactic acid are added to the QMM and subsequently 1.80 parts of tributylamine are added.

EXAMPLE 15 (COMPARATIVE)

The procedure of Example 1 was repeated except the SV was measured by adjusting the pH to 7.0 after inversion of the microemulsion.

TABLE 2

| Example | # of hours @ 50° C. | SV |
|---|---|---|
| 14 | 0 | 2.45 |
|  | 17 | 2.40 |
|  | 33 | 2.02 |

TABLE 2-continued

| Example | # of hours @ 50° C. | SV |
|---|---|---|
|  | 50 | 1.89 |
|  | 66 | 1.77 |
|  | 86 | 1.71 |
| 15C | 0 | 2.50 |
|  | 16 | 1.64 |

C = comparative

EXAMPLE 16

Preparation of Urea-Lactic Acid Solution

An aqueous urea-lactic acid solution was prepared by mixing the following: 1.41 parts (w/w) deionized water; 1.39 parts (w/w) urea, and 1.85 parts (w/w) 85% lactic acid.

EXAMPLES 17 TO 24

Examples 17 to 24 describe the standard viscosity measurements and pH measurement for a series of amines in QMM.

EXAMPLE 17

150.0 Parts (w/w) of the QMM from Example 1 were placed in a vessel with stirring. 3.1% (w/w) of the urea-lactic acid solution of Example 16 and 3% (w/w) of tributylamine were added. The resulting mixture was then stirred for 10 minutes prior to measuring the standard viscosity and pH of the mixture. The pH of the QMM was 5.27; the pH of the solution at inversion was 7.00. The SV of the QMM was 2.62.

EXAMPLE 18 (COMPARATIVE)

The procedure of Example 17 was repeated using triisobutylamine instead of tributylamine. The pH of the QMM was 4.68; the pH of the solution at inversion was 5.7. The SV of the QMM was 1.54.

EXAMPLE 19 (COMPARATIVE)

The procedure of Example 17 was repeated using N,N-dimethyldodecylamine instead of tributylamine. The pH of the QMM was 6.31. The pH of the solution at inversion and the SV of the QMM were not measured because the sample gelled.

EXAMPLE 20 (COMPARATIVE)

The procedure of Example 17 was repeated using N-ethyldicyclohexylamine instead of tributylamine. The pH of the QMM was 4.21. The pH of the solution at inversion and the SV of the QMM were not measured because the sample gelled.

EXAMPLE 21 (COMPARATIVE)

The procedure of Example 17 was repeated using N,N-dimethylundecylamine instead of tributylamine. The pH of the QMM was 5.52; the pH of the solution at inversion was 5.14. The SV of the QMM was 1.3.

EXAMPLE 22 (COMPARATIVE)

The procedure of Example 17 was repeated using N-methyldicyclohexylamine instead of tributylamine. The pH of the QMM was 6.8; the pH of the solution at inversion was 6.67. The SV of the QMM was 2.49. The QMM pH was too high for extended SV stability. After 16 hours at 50° C., The SV was 1.52.

EXAMPLE 23 (COMPARATIVE)

The procedure of Example 17 was repeated using N,N-dimethyloctylamine instead of tributylamine. The resulting QMM was destabilized and the pH of the QMM, the pH of the solution at inversion and the SV measurements were unavailable.

EXAMPLE 24 (COMPARATIVE)

The procedure of Example 17 was repeated using N,N-dimethyldecylamine instead of tributylamine. The pH of the QMM was 5.41. The pH of the solution at inversion and the SV of the QMM were not available as the sample gelled.

TABLE 3

| Example | Amine | QMM pH | Inverted solution pH | SV |
|---|---|---|---|---|
| 17 | Tributylamine | 5.27 | 7.00 | 2.62 |
| 18C | Triisobutylamine | 4.68 | 5.7 | 1.54 |
| 19C | N,N-dimethyldodecylamine | 6.31 | n/a | n/a |
| 20C | N-ethyldicyclohexylamine | 6.21 | n/a | n/a |
| 21C | N,N-dimethyldicyclohexylamine | 5.52 | 5.14 | 1.3 |
| 22C | N-methyldicyclohexylamine | 6.8 | 6.67 | 2.49 |
| 23C | N,N-dimethyloctylamine | n/a | n/a | n/a |
| 24C | N,N-dimethyldecylamine | 5.41 | n/a | n/a |

C = comparative

EXAMPLES 25 AND 26

The QMM from Example 1 and the QMM from Example 17 were placed in a 35° C. oven for a five (5) week period to determine SV stability. SV was measured after 20 minutes by adjusting the dilute polymer solution from Example 1 to pH 7.0 while maintaining the natural pH obtained from Example 18. As a result, polymer degradation was evaluated at the same inverted pH. The SV of the untreated QMM of Example 1 was 1.90 cps., while the SV of the tributylamine modified QMM was 2.52 cps.

What is claimed is:

1. A process for improving development of standard viscosity during inversion of a water in oil quaternary Mannich polymer emulsion, the process comprising preparing a water in oil quaternary Mannich polymer emulsion, comprising quaternary Mannich polymers, a discontinuous aqueous polymer-containing phase, and a continuous oil phase, and admixing the oil with a trialkylamine.

2. The process of claim 1, further comprising preparing the water in oil emulsion as a microemulsion.

3. The process of claim 1, further comprising selecting a trialkylamine that is hydrophobic.

4. The process of claim 3, further comprising selecting the trialkylamine from the group consisting of tripropylamine, tributylamine, and tripentylamine.

5. The process of claim 3, further comprising selecting tributylamine as the trialkylamine.

6. The process of claim 1, further comprising preparing an (alk)acrylamide quaternary Mannich microemulsion as the water in oil emulsion.

7. The process of claim 1, further comprising admixing the water in oil emulsion with a water soluble acid.

8. The process of claim 7, further comprising selecting the acid from the group consisting of lactic acid, sulfuric acid, citric acid, and acetic acid.

9. The process of claim 1, further comprising admixing the water in oil emulsion with tributylamine and lactic acid.

10. A water in oil, quaternary Mannich polymer emulsion having at least one of an increased standard viscosity or an increased rate of standard viscosity development on inversion of the emulsion, the water in oil emulsion comprising quaternary Mannich polymers, a discontinuous aqueous polymer-containing phase, a continuous oil phase, and a trialkylamine.

11. The water in oil emulsion of claim 10, wherein the water in oil emulsion as a microemulsion.

12. The water in oil emulsion of claim 10, wherein the oil is a hydrocarbon liquid.

13. The water in oil emulsion of claim 10, wherein the trialkylamine is hydrophobic.

14. The water in oil emulsion of claim 10, wherein the trialkylamine is selected from the group consisting of tripropylamine, tributylamine, and tripentylamine.

15. The water in oil emulsion of claim 10, wherein the trialkylamine is tributylamine.

16. The water in oil emulsion of claim 10, further comprising an acid.

17. The water in oil emulsion of claim 16, wherein the acid is present in an amount of from about 0.5 to about 2.0 percent by weight, and the trialkylamine is present in an amount of from about 1 to about 5 percent by weight.

18. The water in oil emulsin of claim 16, wherein the acid is selected from the group consisting of lactic acid, sulfuric acid, citric acid, and acetic acid.

19. A water in oil, quaternary Mannich microemulsion having an increased standard viscosity and an increased rate of standard viscosity development on inversion of the microemulsion, the water in oil microemulsion comprising quaternary Mannich polymers, a discontinuous aqueous polymer-containing phase, a continuous oil phase, and a hydrophobic trialkylamine.

20. The water in oil emulsin of claim 19, further comprising a water soluble acid selected from the group consisting of lactic acid, sulfuric acid, citric acid, and acetic acid.

* * * * *